(12) United States Patent
Ichikawa et al.

(10) Patent No.: US 10,474,008 B2
(45) Date of Patent: Nov. 12, 2019

(54) LENS BARREL

(71) Applicant: Panasonic Intellectual Property Management Co., Ltd., Osaka (JP)

(72) Inventors: Taku Ichikawa, Osaka (JP); Atsushi Hasegawa, Osaka (JP); Takumi Kuwahara, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 136 days.

(21) Appl. No.: 15/785,827

(22) Filed: Oct. 17, 2017

(65) Prior Publication Data
US 2018/0113376 A1    Apr. 26, 2018

(30) Foreign Application Priority Data
Oct. 20, 2016    (JP) ................. 2016-206421

(51) Int. Cl.
| | |
|---|---|
| *G03B 17/04* | (2006.01) |
| *G02B 7/02* | (2006.01) |
| *G03B 9/08* | (2006.01) |
| *G03B 17/12* | (2006.01) |

(52) U.S. Cl.
CPC ............ *G03B 17/04* (2013.01); *G02B 7/021* (2013.01); *G03B 9/08* (2013.01); *G03B 17/12* (2013.01)

(58) Field of Classification Search
None
See application file for complete search history.

(56) References Cited

U.S. PATENT DOCUMENTS

2005/0231824 A1* 10/2005 Takahashi ............... G03B 9/22
                                                              359/696
2010/0165488 A1* 7/2010 Ishimasa ................. G02B 7/08
                                                              359/740

FOREIGN PATENT DOCUMENTS

| JP | 5089902 B | 12/2012 |
|---|---|---|
| JP | 2014-002236 | 1/2014 |

* cited by examiner

*Primary Examiner* — William R Alexander
*Assistant Examiner* — Gary W O'Neill
(74) *Attorney, Agent, or Firm* — Renner, Otto, Boisselle & Sklar, LLP

(57) ABSTRACT

A collapsible lens barrel includes: an opening/closing unit (shutter unit) that includes an opening/closing portion (shutter blade) openable and closable along a plane orthogonal to an optical axis to control a light amount, and a maintaining portion (projection) that maintains an opened state of the opening/closing portion; an inner lens disposed closer to an object than the opening/closing unit is; an inner frame that holds the inner lens; an outer lens disposed closer to the object than the inner lens is; an outer frame that holds the outer lens; and a restriction portion that restricts operation of the maintaining portion by restriction applied from the outer frame to the maintaining portion via the inner frame to maintain the opened state of the opening/closing portion when the outer frame and the inner frame are collapsed.

5 Claims, 4 Drawing Sheets

LENS BARREL

BACKGROUND

1. Technical Field

The present disclosure relates to a collapsible lens barrel.

2. Description of the Related Art

Unexamined Japanese Patent Application Publication No. 2014-2236 discloses a lens barrel which includes an opening/closing portion, such as a shutter, configured to remain opened after collapsing the lens barrel.

SUMMARY

Provided according to the present disclosure is a lens barrel capable of reducing interference between a lens and an opening/closing portion caused by switching from an opened state to a closed state of the opening/closing portion even when a shock is applied to the lens barrel.

A lens barrel according to the present disclosure is directed to a collapsible lens barrel which includes: an opening/closing unit that includes an opening/closing portion openable and closable along a plane orthogonal to an optical axis to control a light amount, and a maintaining portion that maintains an opened state of the opening/closing portion; an inner lens disposed closer to an object than the opening/closing unit is; an inner frame that holds the inner lens; an outer lens disposed closer to the object than the inner lens is; an outer frame that holds the outer lens; and a restriction portion that restricts operation of the maintaining portion by restriction applied from the outer frame to the maintaining portion via the inner frame to maintain the opened state of the opening/closing portion when the outer frame and the inner frame are collapsed.

DETAILED DESCRIPTION

Specific exemplary embodiments are hereinafter described in detail with reference to the drawings. However, excessively detailed description may be omitted where appropriate. For example, detailed description of well-known matters, and repetitive description of substantially identical configurations may be omitted. These omissions are made to avoid unnecessary redundancy of the following description, and help easy understanding by those skilled in the art. In addition, an expression including "substantially", such as substantially parallel and substantially orthogonal, may be used in the following description of the exemplary embodiments. For example, a substantially parallel state refers to not only a completely parallel state, but also a substantially parallel state, such as a state deviating from a completely parallel state by several percent. This definition is applicable to other expressions including "substantially".

The accompanying drawings and the following description are presented by the present inventor only for helping full understanding of the present disclosure by those skilled in the art. It is therefore not intended that subject matters described in the appended claims be limited by the respective drawings and the description.

First Exemplary Embodiment

[1-1. General Configuration of Lens Barrel]

Figure 1:
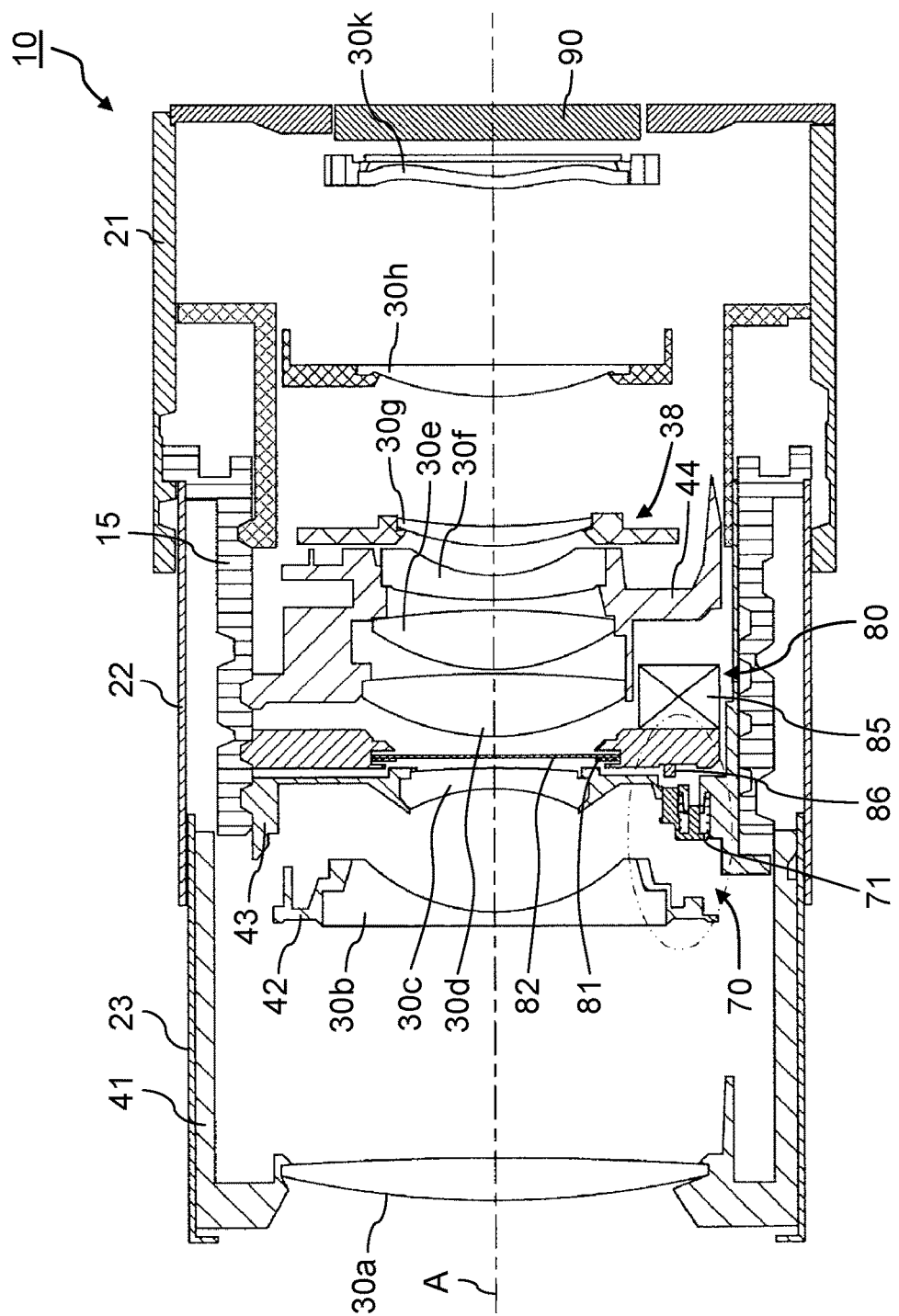
FIG. 1 is a cross-sectional view illustrating a general configuration of a lens barrel in an extended state according to a first exemplary embodiment.
Figure 2:
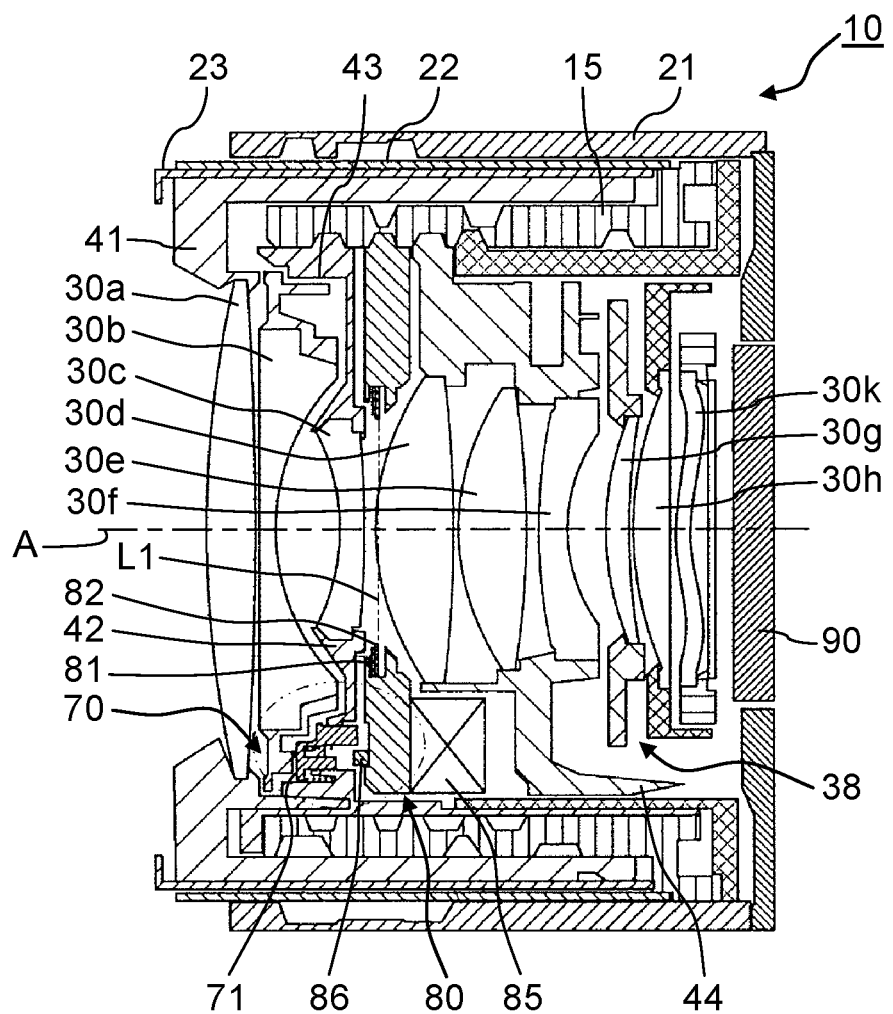
FIG. 2 is a cross-sectional view illustrating the general configuration of the lens barrel in a collapsed state according to the first exemplary embodiment.

A configuration of a lens barrel according to a first exemplary embodiment is hereinafter described with reference to the drawings. FIG. 1 is a cross-sectional view of a general configuration of lens barrel 10 according to the present exemplary embodiment, illustrating an extended state of lens barrel 10. FIG. 2 is a cross-sectional view of a general configuration of lens barrel 10 according to the present exemplary embodiment, illustrating a collapsed state of lens barrel 10.

Lens barrel 10 illustrated in FIGS. 1 and 2 is an optical device included in an imaging apparatus such as a compact digital camera. More specifically, lens barrel 10 is a collapsible lens barrel which is extended for zooming while shooting, and collapsed for storage while not shooting.

Lens barrel 10 includes base barrel 21, first barrel 22 and second barrel 23, a plurality of lenses 30a through 30h and 30k stored inside these barrels, and imaging element 90. Imaging element 90 is constituted by a charge coupled device (CCD) imaging sensor, or a complementary metal oxide semiconductor (CMOS) imaging sensor, for example.

Base barrel 21 is a barrel attached to a camera body (not shown), while first barrel 22 and second barrel 23 are barrels movable in a direction of optical axis A relative to base barrel 21.

More specifically, cam frame 15 provided inside lens barrel 10 rotates around optical axis A by driving force of a motor (not shown), and moves in the direction of optical axis A in accordance with rotation around optical axis A. Each of first barrel 22 and other elements includes a cam pin engaging with a cam groove formed in cam frame 15. Accordingly, first barrel 22 and other elements are movable in the direction of optical axis A in accordance with the rotation and movement of cam frame 15. A full length of lens barrel 10 is therefore allowed to increase and decrease in the direction of optical axis A. In other words, the full length of lens barrel 10 is variable to perform a zooming operation and a collapsing operation.

As illustrated in FIG. 1, lenses 30a, 30b, 30c are held by holding frames 41, 42, 43, respectively, movable independently from each other. Respective lenses 30a, 30b, 30c are therefore also movable independently from each other in accordance with independent movements of respective holding frames 41, 42, 43 achieved by the rotation and movement of cam frame 15.

According to the present exemplary embodiment, lenses 30d, 30e, and 30f are held by single lens holding frame 44. Lens holding frame 44 is movable in the direction of optical axis A in accordance with the rotation and movement of cam frame 15. Accordingly, lenses 30*d*, 30*e*, and 30*f* are also movable in the direction of optical axis A in synchronization with lens holding frame 44. A part of lens holding frame 44 constitutes image stabilizer unit 38. Image stabilizer unit 38 is movable in the direction of optical axis A in accordance with movement of lens holding frame 44 in the direction of optical axis A. Accordingly, an image stabilizer lens (lens 30*g* in present exemplary embodiment) included in image stabilizer unit 38 is also movable in the direction of optical axis A in synchronization with lenses 30*d*, 30*e*, and 30*f*.

Shutter unit 80 is disposed closer to an object (object shot through lens barrel 10 and located on left side in FIGS. 1 and 2) than lens holding frame 44 is. Shutter unit 80 includes diaphragm blade 81, shutter blade 82 and the like for controlling an exposure value and an exposure time of imaging element 90. According to the present exemplary embodiment presented by way of example, shutter blade 82 is disposed closer to an imaging plane than diaphragm blade 81 is. However, diaphragm blade 81 may be disposed closer to the imaging plane than shutter blade 82 is. Diaphragm blade 81 and shutter blade 82 are driven along a plane orthogonal to optical axis A by driving unit 85 included in shutter unit 80. Accordingly, each of diaphragm blade 81 and shutter blade 82 is an example of an opening/closing portion for controlling a light amount. Shutter unit 80 includes a maintaining portion for mechanically maintaining an opened state of shutter blade 82. More specifically, the maintaining portion is a part of a power transmission mechanism extending from driving unit 85 to shutter blade 82, and corresponds to projection 86 projecting outward from shutter unit 80. Projection 86 slides in the direction orthogonal to optical axis A in linkage with opening or closing of shutter blade 82 to change a position of projection 86. When shutter blade 82 is in a closed state, projection 86 is located at a first position (see FIG. 1). On the other hand, when shutter blade 82 is in the opened state, projection 86 comes to a second position which is farther from optical axis A than the first position is (see FIG. 2). Projection 86 is restricted and fixed to the second position to maintain shutter blade 82 in the opened state. Restriction mechanism 70 for restricting projection 86 at the second position will be detailed below.

Lens 30*h* is disposed closer to the imaging plane (a side of imaging element 90, that is the right side in FIGS. 1 and 2) than image stabilizer unit 38 is. Lens 30*h* is provided for correction of a change of the imaging plane and for focusing during the zooming operation of lens barrel 10. Lens 30*h* moves in the direction of optical axis A by driving force of the motor (not-shown). Lens 30*k* for correction of aberration is disposed closer to the imaging plane than image stabilizer lens 30*g* is. Light passes through lenses 30*a* through 30*h* and further through lens 30*k*, and forms an image on imaging element 90. Data indicating the formed image is acquired from imaging element 90.

[1-2. Restriction Mechanism]

Restriction mechanism 70 included in lens barrel 10 is hereinafter described.

Figure 3:
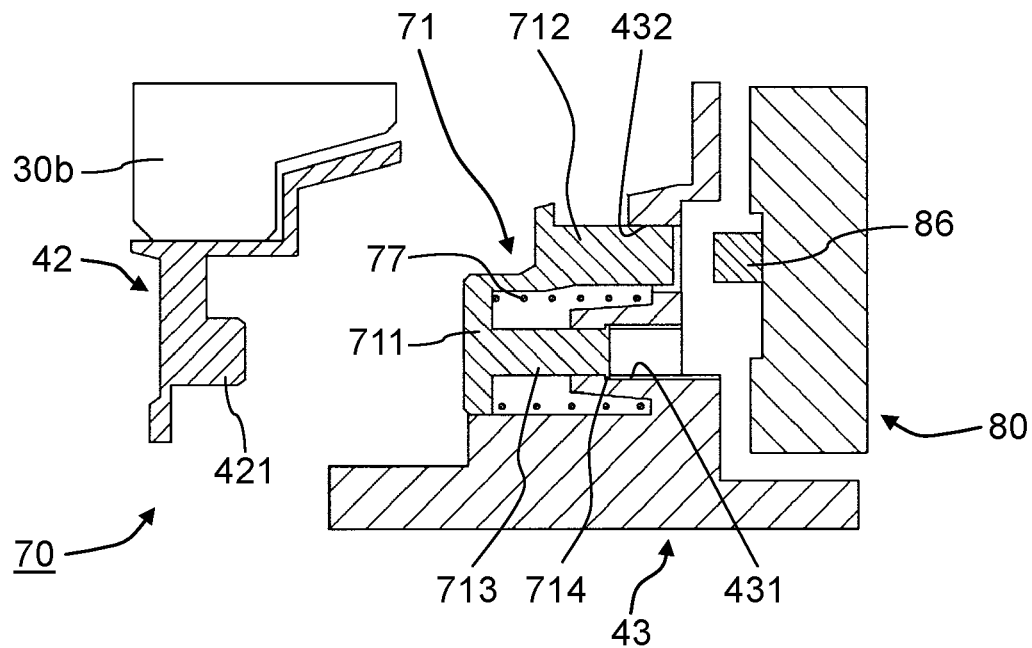
FIG. 3 is a cross-sectional view illustrating a general configuration of a restriction mechanism during non-restriction according to the first exemplary embodiment.
Figure 4:
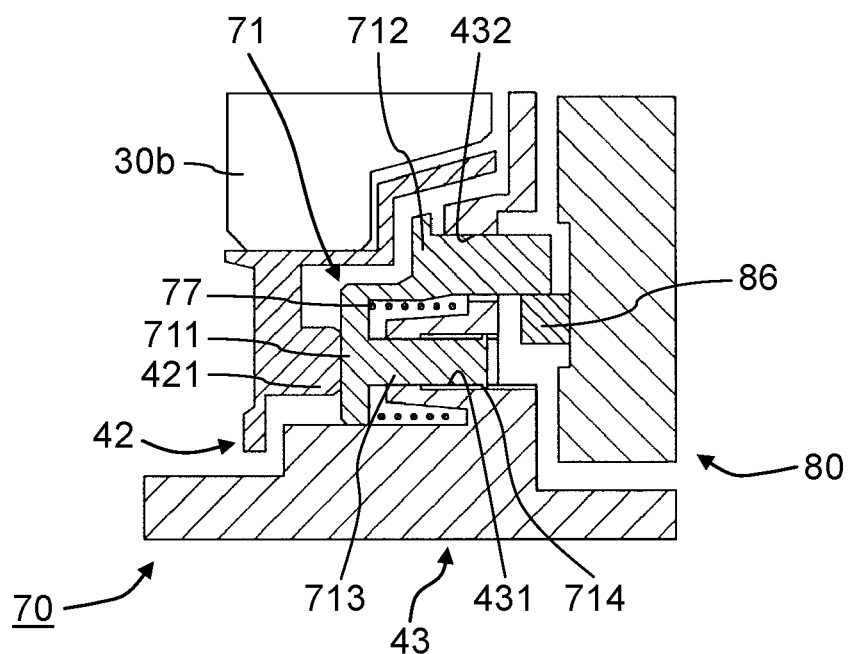
FIG. 4 is a cross-sectional view illustrating the general configuration of the restriction mechanism during restriction according to the first exemplary embodiment.

FIG. 3 is a cross-sectional view illustrating a general configuration of restriction mechanism 70 during non-restriction according to the first exemplary embodiment. More specifically, FIG. 3 is a view illustrating an enlarged part of an ellipse represented by a two-dot chain line in FIG. 1. FIG. 4 is a cross-sectional view of the general configuration of restriction mechanism 70 during restriction according to the first exemplary embodiment. More specifically, FIG. 4 is a view illustrating an enlarged part of an ellipse represented by a two-dot chain line in FIG. 2.

As illustrated in FIGS. 3 and 4, restriction mechanism 70 is constituted by restriction portion 71, a part of holding frame 43, and a part of holding frame 42.

Restriction portion 71 is a member disposed at a position capable of engaging with projection 86 corresponding to the maintaining portion and maintains the opened state of shutter blade 82. Restriction portion 71 includes body portion 711 and extending portion 712 formed integrally with each other. Body portion 711 includes cylindrical guide shaft 713. Flange portion 714 formed at a tip of guide shaft 713 projects outward. Extending portion 712 extends continuously from body portion 711 in a direction substantially in parallel with guide shaft 713. Extending portion 712 is provided such that a tip of extending portion 712 is located closer to the imaging plane than the tip of guide shaft 713 is.

Holding frame 43 is an inner frame which holds lens 30*c* (inner lens) disposed closer to the object than shutter unit 80 is. Restriction portion 71 is held by holding frame 43 in such a manner as to be freely movable relative to the imaging plane. More specifically, a lower end portion of holding frame 43 includes first through hole 431 into which guide shaft 713 of restriction portion 71 is inserted, and second through hole 432 into which extending portion 712 is inserted. Spring 77 is further provided between holding frame 43 and restriction portion 71. Spring 77 presses restriction portion 71 toward the object in a state of insertion of guide shaft 713 into first through hole 431, and insertion of extending portion 712 into second through hole 432.

First through hole 431 has two stages constituted by a large-diameter imaging plane side portion, and a small-diameter object side portion. The large-diameter portion has a diameter larger than a diameter of flange portion 714 of guide shaft 713, while the small-diameter portion has a smaller diameter than the diameter of flange portion 714. According to this configuration, flange portion 714 is caught by first through hole 431 at a boundary between the large-diameter portion and the small-diameter portion. Accordingly, restriction portion 71 is not separated from holding frame 43 even under pressure applied from spring 77 to restriction portion 71 in the direction toward the object.

Holding frame 42 is an outer frame which holds lens 30*b* (outer lens) disposed closer to the object than holding frame 43 is. Projection 421 projecting toward the imaging plane is provided on holding frame 42 at a portion facing restriction portion 71. A projection projecting toward holding frame 42 may be provided on restriction portion 71 instead of projection 421 of holding frame 42.

As illustrated in FIG. 3, holding frame 42 is separated from holding frame 43 in the extended state, in which condition projection 421 is also separated from restriction portion 71. Accordingly, restriction portion 71 moves closer to the object and disengages from projection 86 of shutter unit 80 under pressure applied from spring 77 to restriction portion 71. In the state of disengagement between restriction portion 71 and projection 86, movement of projection 86 is also not restricted. In other words, shutter blade 82 is openable and closable.

When the imaging apparatus including lens barrel 10 is powered off in this state, for example, the extended state of lens barrel 10 is switched to the collapsed state. On the other hand, shutter blade 82 of shutter unit 80 is in the opened state. More specifically, during power off, shutter blade 82 remains in the opened state and is not electrically operable. In this state, projection 86 is located at the second position.

In the collapsed state, holding frame 42 is located close to holding frame 43, in which condition projection 421 constituting a part of holding frame 42 presses restriction portion 71. Restriction portion 71 pressed by projection 421 moves toward the imaging plane while receiving pressure from spring 77. More specifically, guide shaft 713 of restriction portion 71 is guided along first through hole 431, whereby extending portion 712 projects toward the imaging plane to come to an engaging position engaging with projection 86 located at the second position. In more detail, extending portion 712 of restriction portion 71 comes into contact and engages with projection 86. As a result, the opened state of shutter blade 82 is maintained by restriction of sliding movement of projection 86.

The "engaging position" in this context refers to a position at which restriction portion 71 is allowed to restrict sliding of projection 86 located at the second position. Accordingly, extending portion 712 of restriction portion 71 need not be in contact with projection 86 as long as extending portion 712 lies on a moving route of projection 86. In other words, a clearance between projection 86 and restriction portion 71 may be produced as long as shutter blade 82 does not come into the closed state.

Line L1 represented by a two-dot chain line in FIG. 2 indicates a position of shutter blade 82 in the closed state. In the collapsed state illustrated in FIG. 2, an object side portion of other lens 30d, which is a lens different from the inner lens and the outer lens, and is located closer to the imaging plane than shutter unit 80 is, overlaps with Line L1. Accordingly, other lens 30d in the collapsed state is located on the inner side of shutter blade 82 in the opened state.

[1-3. Advantageous Effects and Others]

As described above, collapsible lens barrel 10 according to the present exemplary embodiment includes: shutter unit 80 (opening/closing unit) that includes shutter blade 82 (opening/closing portion) openable and closable along a plane orthogonal to optical axis A to control a light amount, and projection 86 (maintaining portion) that maintains the opened state of shutter blade 82; lens 30c (inner lens) disposed closer to the object than shutter unit 80 is; holding frame 43 (inner frame) that holds lens 30c; lens 30b (outer lens) disposed closer to the object than lens 30c is; holding frame 42 (outer frame) that holds lens 30b; and restriction portion 71 that restricts operation of projection 86 by restriction applied from holding frame 42 to projection 86 via holding frame 43 to maintain the opened state of shutter blade 82 when holding frames 42 and 43 are collapsed.

According to this configuration, restriction portion 71 restricts the operation of projection 86 by restriction applied from holding frame 42 to projection 86 via holding frame 43 when holding frames 42 and 43 are collapsed. More specifically, projection 86 moves to the second position to maintain the opened state of shutter blade 82. The opened state of shutter blade 82 is therefore maintained even when a shock is applied to lens barrel 10. Accordingly, shutter blade 82 does not interfere with lenses 30c and 30b, wherefore damage of lenses 30c and 30b and breakage of shutter blade 82 caused by contact between lenses 30c and 30d and shutter blade 82 are avoidable.

Moreover, according to this configuration, a relative positional relationship between holding frame 42 corresponding to the outer frame, and holding frame 43 corresponding to the inner frame considerably changes in accordance with switching from the extended state to the collapsed state. According to the present exemplary embodiment, restriction portion 71 operates while utilizing the relative positional change between holding frames 42 and 43, and therefore easily reaches a position engaging with projection 86 in accordance with the positional change. Accordingly, no limitation is imposed on positioning of holding frame 43 and shutter unit 80. As a result, a degree of freedom in optical design increases. Lens barrel 10 further includes other lens 30d disposed closer to the imaging plane than shutter unit 80 is. At least one of lens 30c and lens 30d is disposed inside shutter blade 82 in the opened state when holding frame 42 and holding frame 43 are collapsed.

According to this configuration, lens 30d is disposed inside shutter blade 82 in the opened state when holding frame 42 and holding frame 43 are collapsed. Lens 30d in this state is therefore positioned close to shutter unit 80. Accordingly, size reduction of lens barrel 10 is achievable.

In addition, restriction portion 71 provided on holding frame 43 is freely movable in the direction from holding frame 43 toward the imaging plane. In the collapsed state of holding frames 42 and 43, extending portion 712 of restriction portion 71 pressed by holding frame 42 projects toward the imaging plane and reaches the position engaging with projection 86 of shutter unit 80.

According to this configuration, restriction portion 71 is held on holding frame 43 in such a condition as to be freely movable in the direction from holding frame 43 toward the imaging plane. Restriction portion 71 is therefore constantly held by holding frame 43 either in the collapsed state or in the extended state. Assuming that restriction portion 71 is configured to separate from holding frame 43, openings formed in holding frame 43 (e.g., first through hole 431 and second through hole 432) are opened by separation of restriction portion 71 from holding frame 43. When the openings are opened, undesirable conditions such as leakage of light toward the imaging plane via the openings may be caused.

According to the present exemplary embodiment, however, restriction portion 71 is held by holding frame 43 in such a condition as to be freely movable as described above. Accordingly, the openings are kept closed without leakage of light.

Second Exemplary Embodiment

[2-1. Configuration]

According to the first exemplary embodiment presented by way of example, restriction portion 71 is held by holding frame 43 corresponding to an inner frame. According to a second exemplary embodiment, however, a restriction portion is provided on a holding frame corresponding to an outer frame. In the following description, parts similar to the corresponding parts described in the first exemplary embodiment have been given similar reference numbers, and the same description of these parts may not be repeated.

Figure 5:
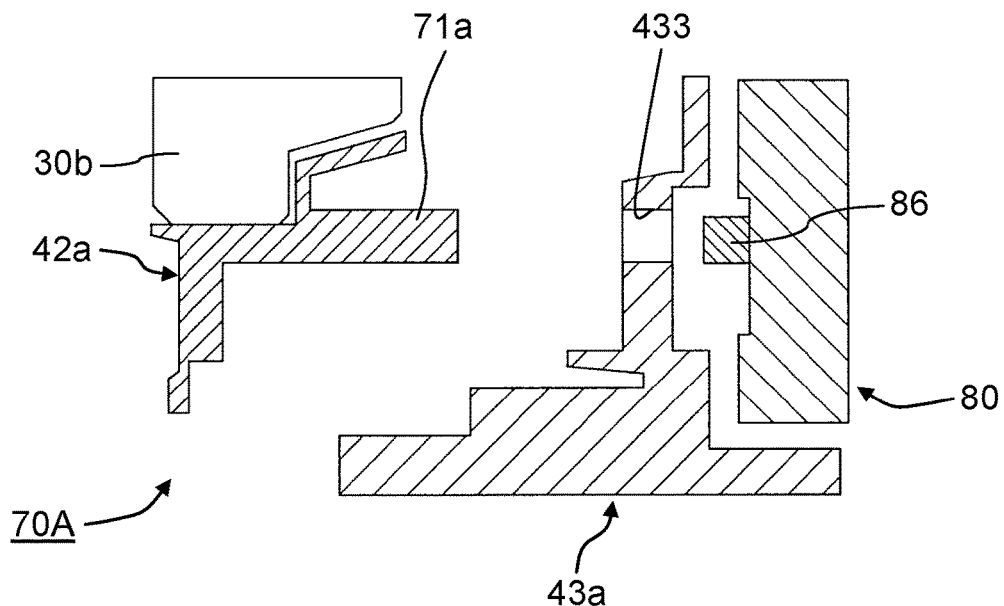
FIG. 5 is a cross-sectional view illustrating a general configuration of a restriction mechanism during non-restriction according to a second exemplary embodiment.
Figure 6:
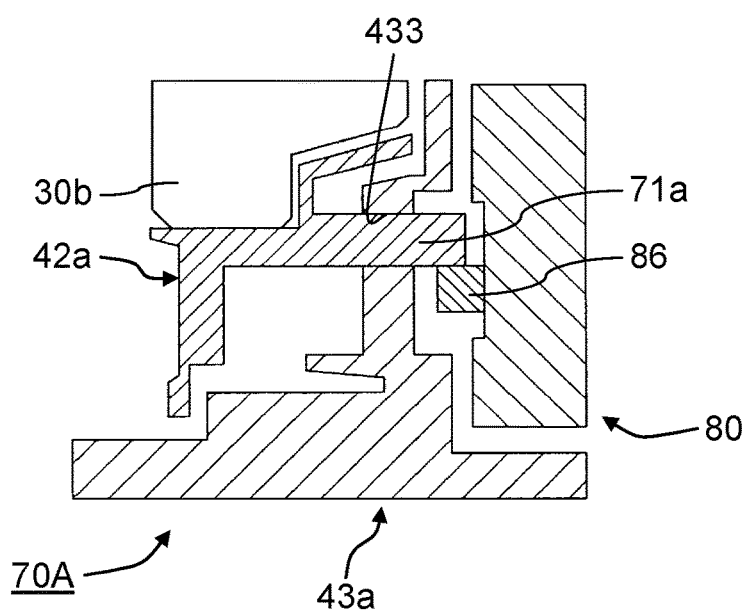
FIG. 6 is a cross-sectional view illustrating the general configuration of the restriction mechanism during restriction according to the second exemplary embodiment.

FIG. 5 is a cross-sectional view illustrating a general configuration of restriction mechanism 70A during non-restriction according to the second exemplary embodiment. More specifically, FIG. 5 is a view presented in correspondence with FIG. 3. FIG. 6 is a cross-sectional view illustrating the general configuration of restriction mechanism 70A during restriction according to the second exemplary embodiment. More specifically, FIG. 6 is a view presented in correspondence with FIG. 4.

As illustrated in FIGS. 5 and 6, restriction mechanism 70A according to the second exemplary embodiment includes restriction portion 71a projecting from holding frame 42a toward the imaging plane. Restriction portion 71a is formed integrally with holding frame 42a. Holding frame 43a includes through hole 433 penetrated by restriction portion 71a. Restriction portion 71a penetrates through hole 433, and reaches a position engaging with projection 86.

In the extended state, holding frame 42a is separated from holding frame 43a, in which condition restriction portion 71a is also separated from holding frame 43a as illustrated in FIG. 5. Accordingly, restriction portion 71a disengages from projection 86 of shutter unit 80. In the disengagement state between restriction portion 71a and projection 86, movement of projection 86 is not restricted, i.e., shutter blade 82 is openable and closable.

When the extended state of lens barrel 10 is subsequently switched to the collapsed state by power off of the imaging apparatus including lens barrel 10, holding frame 42a approaches holding frame 43a to come into the collapsed state. More specifically, restriction portion 71a penetrates through hole 433 to come to the engaging position engaging with projection 86 located at the second position as illustrated in FIG. 6. More specifically, restriction portion 71a comes into contact and engages with projection 86. As a result, the opened state of shutter blade 82 is maintained by restriction of sliding movement of projection 86.

[2-2. Advantageous Effects and Others]

As described above, restriction portion 71a according to the present exemplary embodiment projects from holding frame 42a toward the imaging plane. When holding frames 42a and 43a are collapsed, restriction portion 71a penetrates holding frame 43a and reaches the engaging position engaging with projection 86.

According to this configuration, restriction portion 71a projecting from holding frame 42a toward the imaging plane is formed integrally with holding frame 42a. Accordingly, a custom part constituting a restriction portion is not required. This configuration contributes to reduction of a number of parts.

Other Exemplary Embodiments

The first and second exemplary embodiments have been described herein by way of example of the technology disclosed in the present application. However, the technology according to the present disclosure is not limited to the first and second exemplary embodiments described herein, but may be applicable to other exemplary embodiments including appropriate modifications, replacements, additions, omissions and the like.

For example, while other lens 30d is disposed inside opened shutter blade 82 in the collapsed state according to the respective exemplary embodiments described herein, lens 30c may be disposed inside opened shutter blade 82, rather than other lens 30d. Alternatively, both other lens 30d and lens 30c may be disposed inside opened shutter blade 82.

According to the exemplary embodiments described herein, shutter blade 82 is presented as an example of the opening/closing portion maintained in the opened state. However, diaphragm blade 81 corresponding to another example of the opening/closing portion may be maintained in the opened state by a configuration similar to the configuration of the opening/closing portion described above. Similarly, in case of a lens barrel including a neutral density (ND) filter, an opened state of the ND filter may be maintained by a configuration similar to the configuration of the opening/closing portion described above. In this case, a unit including the ND filter constitutes an opening/closing unit.

According to the present exemplary embodiments described herein by way of example, projection 86 included in shutter unit 80 corresponds to the maintaining portion. However, the maintaining portion may have any configurations as long as the opened state of shutter blade 82 can be maintained. In case of a press button type maintaining portion, for example, the opened state of shutter blade 82 may be maintained by a restriction portion configured to press the maintaining portion to restrict operation of the maintaining portion.

OTHERS

The respective specific exemplary embodiments have been described herein by way of example of the technology according to the present disclosure. The accompanying drawings and the detailed description have been presented for this purpose.

Accordingly, the constituent elements depicted and described in the accompanying drawings and the detailed description may include not only constituent elements essential for solutions to problems, but also constituent elements not essential for solutions to problems to present only specific examples of the technology. It should not be therefore determined that the unessential constituent elements in the accompanying drawings and the detailed description are essential only based on the fact that these constituent elements are included in the drawings and the description.

Moreover, the respective exemplary embodiments, as presented only by way of example of the technology according to the present disclosure, may include various modifications, replacements, additions, and omissions and the like, without departing from a range defined by the appended claims and a range equivalent to this range. Combinations of the respective exemplary embodiments and other examples may be further practiced.

The present disclosure is applicable to a collapsible lens barrel.

What is claimed is:

1. A collapsible lens barrel, comprising:
   an opening/closing unit that includes an opening/closing portion openable and closable along a plane orthogonal to an optical axis to control a light amount, and a maintaining portion that maintains an opened state of the opening/closing portion;
   an inner lens disposed closer to an object than the opening/closing unit is, the inner lens being orthogonal to the optical axis;
   an inner frame that holds the inner lens;
   an outer lens disposed closer to the object than the inner lens is, the outer lens being orthogonal to the optical axis;
   an outer frame that holds the outer lens; and
   a restriction portion that restricts operation of the maintaining portion by restriction applied from the outer frame to the maintaining portion via the 15 inner frame to maintain the opened state of the opening/closing portion when the outer frame and the inner frame are collapsed.

2. The collapsible lens barrel according to claim 1, further comprising an other lens disposed closer to an imaging plane than the opening/closing unit is,
   wherein at least one of the inner lens and the other lens is disposed inside the opening/closing portion in the opened state when the outer frame and the inner frame are collapsed.

3. The collapsible lens barrel according to claim 1, wherein
   the restriction portion is provided on the inner frame in such a condition as to be freely movable in a direction from the inner frame toward the imaging plane, and the restriction portion projects toward the imaging plane by being pressed by the outer frame and restricts the operation of the maintaining portion when the outer frame and the inner frame are collapsed.

4. The collapsible lens barrel according to claim 1, wherein
the restriction portion projects from the outer frame toward the imaging plane, and
the restriction portion penetrates the inner frame to restrict the 10 operation of the maintaining portion when the outer frame and the inner frame are collapsed.

5. The collapsible lens barrel according to claim 1, wherein when the collapsible lens barrel is in a shooting state, the inner lens is disposed closer to the object than the opening/closing unit is.

* * * * *